Aug. 26, 1952     E. SCHUSTER ET AL     2,608,352
THERMOSTATICALLY CONTROLLED VALVE
Filed Aug. 14, 1948     3 Sheets-Sheet 1
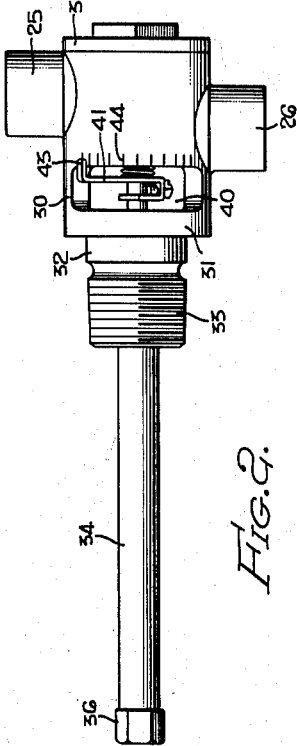
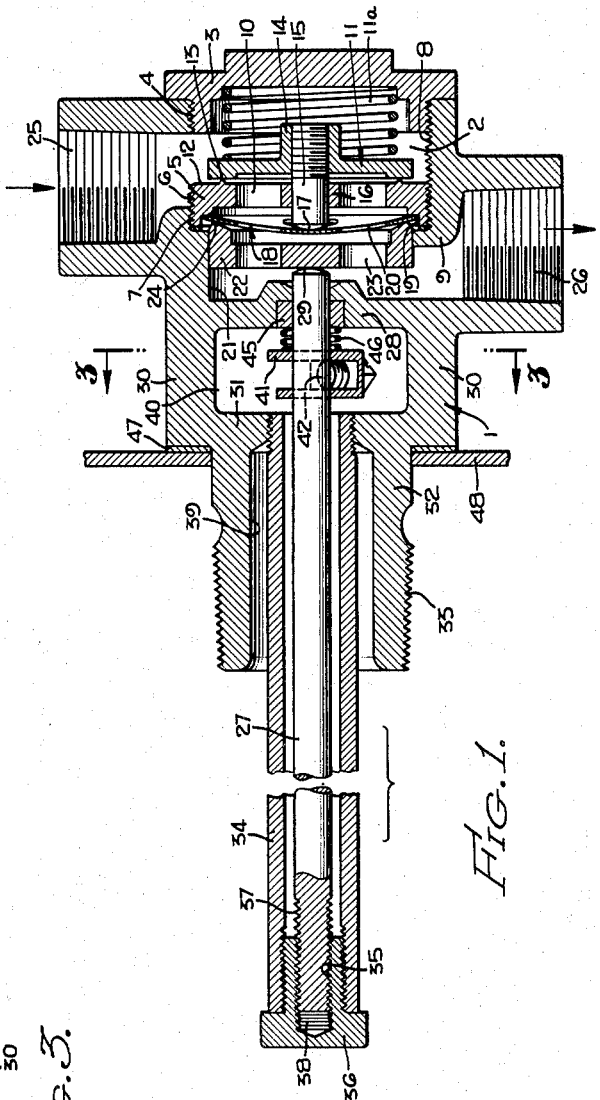
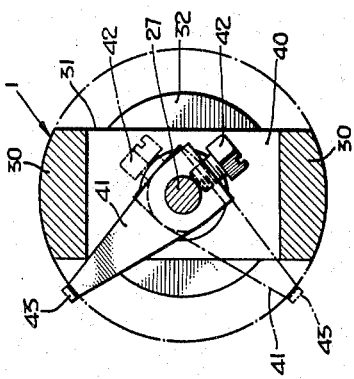
ERICH SCHUSTER
RAYMOND D. GATES
INVENTORS
BY Francis D. Cummin
ATTORNEY

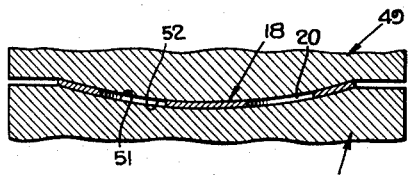
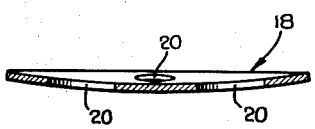
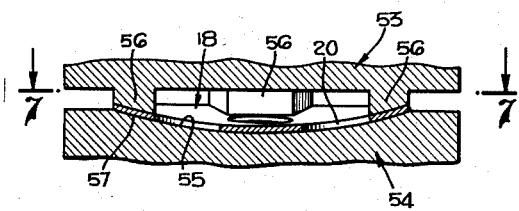
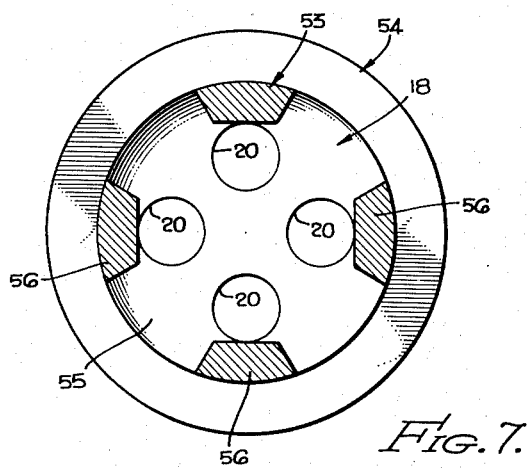
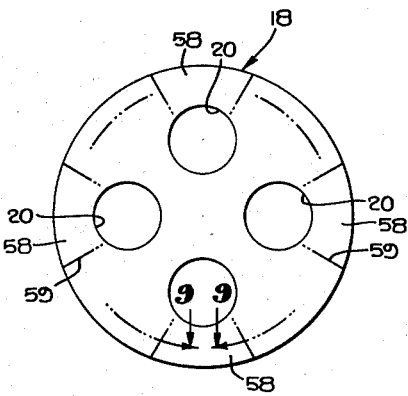
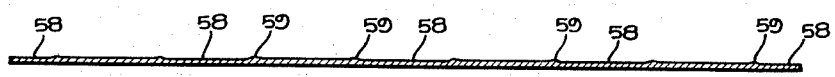

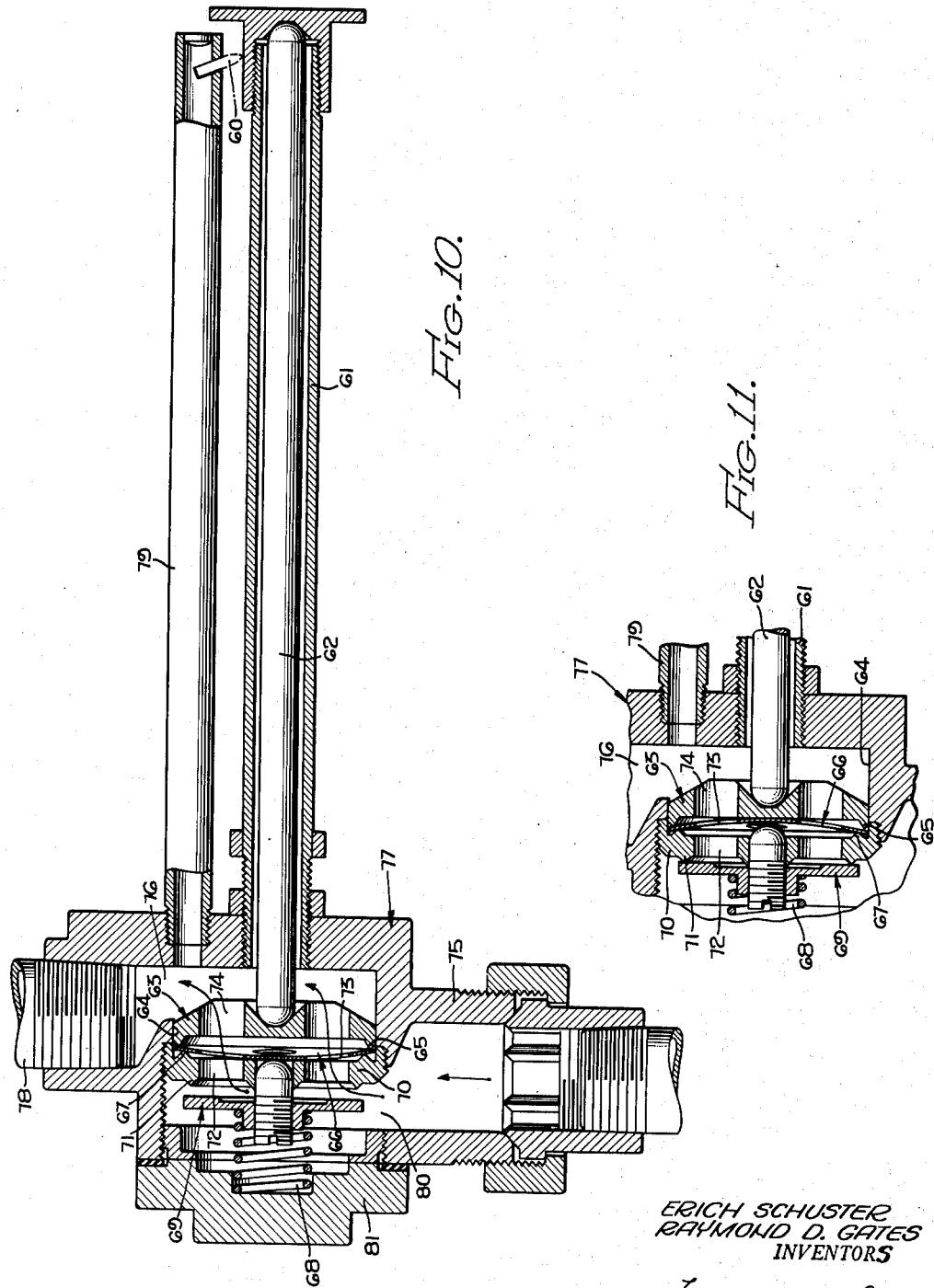

Patented Aug. 26, 1952

2,608,352

UNITED STATES PATENT OFFICE 2,608,352

THERMOSTATICALLY CONTROLLED VALVE

Erich Schuster, Downey, and Raymond D. Gates, South Gate, Calif., assignors to Utility Control Company, a corporation of California Application August 14, 1948, Serial No. 44,308

1 Claim. (Cl. 236—48)

This invention relates to thermostatically controlled mechanisms or apparatus, and particularly concerns means employed for automatically shifting a valve from one position to another through the agency of a heat-sensitive or thermostatically controlled part.

Devices operating on this principle usually employ a disc commonly known as a snap disc. These discs are so constructed that they can maintain themselves in a condition of equilibrium with either side disposed in a convex form. In practice, they are mounted so that when a heat-controlled part presses against the disc on the convex side it will, when pressed beyond a certain point, suddenly snap over to an opposite position in which the face of the disc that was in a concave condition, assumes a convexly curved condition.

When such a snap action disc is employed in valves, the disc is usually in axial alignment with the valve, as a result of which it has heretofore been necessary to provide ports for the flow of the fluid controlled by the valve, around the edges of the disc. This requirement necessitates increasing the dimensions of the valve casing and complicates the form of cores which must be used in casting the casings of such valves. One of the objects of this invention is to provide a construction for the snap action disc, and for the parts associated with the valve closure, which will enable the fluid passing through the valve to flow directly through the snap action disc, and the port or ports associated with the valve-seat.

There are many specific applications that could be made for this snap action disc having these characteristics. In the present specification I have illustrated the disc as applied to two types of thermostatically controlled mechanism, in one of which the disc co-operates with the valve closure and associated parts in such a way as to effect the movement of the closure relative to the seat so as to control the flow of fluid through the valve opening, for example, the closing of a valve that is supplying fuel to a furnace or to a heater of any kind when the thermostatically controlled part operates automatically to effect the closing of the valve to reduce the quantity of heat being developed by the fuel that is passing through the valve.

Another type of valve is also illustrated, which operates as a safety device associated with a burner that includes a pilot for insuring the ignition of the burner when the main valve is open to admit the fuel. These safety devices are commonly used to effect the automatic closing of a thermostatically controlled valve if the pilot flame should become extinguished. In one of the embodiments of the invention illustrated, the bearer, that is to say, the member controlled by the heat-sensitive member of the thermostatic device, presses against the disc adjacent its extreme edge, and in the other form the bearer presses against the disc between the edge of the disc and its geometrical center, but preferably quite close to the edge of the disc.

The invention consists in the novel organization of parts co-operating with the disc to enable it to perform its function satisfactorily in a thermostatically controlled mechanism.

A preferred embodiment of the invention is described in the following specification, while the broad scope of the invention is pointed out in the appended claim.

In the drawings:

Fig. 1 is a longitudinal section taken through a valve mechanism of the type such as employed for maintaining the water in a storage tank at a substantially constant temperature. A portion of this view is broken away.

Fig. 2 is a side elevation of the mechanism illustrated in Fig. 1, but upon a reduced scale.

Fig. 3 is a vertical cross-section taken about on the line 3—3 of Fig. 1.

Fig. 4 is a vertical section through two dies, and illustrating the same operating upon a blank disc; and illustrates the first step in a method that may be employed for producing a disc capable of functioning in snap-action mechanism of our invention. In this view the body portions of the dies are broken away.

Fig. 5 is a vertical section through the disc after it is taken from the dies illustrated in Fig. 4.

Fig. 6 is a view similar to Fig. 4, but illustrating the dies employed in the next step in the illustrated method of producing this disc.

Fig. 7 is a horizontal section through the upper die illustrated in Fig. 6, taken about on the line 7—7 of Fig. 6.

Fig. 8 is a plan of the completed disc.

Fig. 9 is a developed horizontal section taken on the line 9—9 of Fig. 8, particularly illustrating the disposition of the material of the disc due to the use of dies illustrated in Figs. 4 and 6.

Fig. 10 is a longitudinal section through a thermostatically controlled valve mechanism, which constitutes a safety shut-off means to close off flow of fuel through a valve in case the pilot flame becomes extinguished. In this view the pilot tube is illustrated partially in elevation.

Fig. 11 is a fragmentary section showing the valve illustrated in Fig. 10, together with parts immediately associated with it, and representing the valve closure in its closed position instead of in its open position as illustrated in Fig. 10.

Referring to Figs. 1 to 3 illustrating a thermostatically controlled valve that is intended to function as an automatic heat control for maintaining a substantially constant temperature in a storage tank or the like, heated by a fuel supplied through this mechanism, in these figures the valve casing 1 has a valve chamber 2 formed therein, which is accessible from the exterior by removal of a plug 3 secured in place by a thread connection 4. At the inner end of the valve chamber, a valve-seat 5 is provided, which has an external thread 6 enabling it to be screwed into a threaded socket 7, which socket in the present instance, carries threads which are an extension of the threads 8 which are employed in the thread connection 4. By reason of the fact that the threads for socketing the valve-seat 5 are of the same diameter, and the same number of threads per inch as the thread connection 4, it is not necessary to have the diameter of the outer thread connection 4 larger than the diameter of the valve-seat 5 because the valve-seat 5 can be threaded right into the threaded opening for the plug or cover 3, and continued right on until it is mounted in its threaded socket in the inner wall 9 of the valve casing.

The valve-seat 5 has a body of disc-form with a plurality of circumferentially disposed ports 10 through which the fluid such as gas, can flow when the valve closure 11 is lifted out of contact with the seat 5. The seat face 12 of the valve-seat is preferably provided with an annular rib or bead 13 of substantially conical section, which presents a "knife edge" against which the inner face of the valve closure 11 rests when the valve is in its closed position. The valve closure 11 which is of disc-form, has an integral hub or boss 14 in which a stud 15 is threaded, said stud 15 being guided through the nave 16 of the valve-seat 5.

The inner end of the stud 15 projects beyond the inner face of the valve-seat 5 and terminates in a filister 17 that rests against the central portion of the snap action disc 18. The inner end of the valve-seat 5 is preferably formed with a counterbore 19 which is of sufficient diameter to enable this counterbore 19 to operate as a socket for holding the snap disc 18. The disc 18 is provided with a plurality of openings 20 that are preferably circumferentially disposed, and which preferably have substantially the same area as the total area of the ports or openings 10 that have been referred to, and which are formed in the valve-seat 5.

One the side of the disc 18 remote from the valve-seat, the valve casing 1 is provided with a guide bore 21 for a bearer 22. This bearer 22 has a plurality of ports or openings 23 through it, which preferably have a total area substantially equal to the total area of the ports 10 and the ports 20 through the snap disc. This bearer has an annular shoulder 24 having the form of a dihedral edge formed by the intersection of two conical faces substantially as shown. This forms a "knife edge" contact normally resting against the convex face of the snap disc adjacent to its edge.

The valve casing 1 is provided with suitable means for connecting it up in a fuel line. In the present instance, this is illustrated as including a threaded inlet 25 with pipe thread to enable a gas connection to be established for bringing the fuel gas to the valve. After this gas has passed under the valve 11 (when the same is off its seat) it flows through the openings 10 in the valve-seat 5 and then through the openings 20 in the snap disc, and thence through the openings 23 in the bearer so that it can pass out through a threaded outlet 26 that leads the gas to the burner, or burners.

Suitable heat-sensitive or thermostatic control means is provided for thrusting against the side of the bearer 22 remote from the disc 18, to cause the disc 18 to snap over to an opposite position when the temperature of the water in the tank drops to a minimum point at which the thermostatic control will open the valve closure 11. In the present instance, the means illustrated for this purpose is the usual means, including an Invar rod 27, the inner end of which is guided to slide freely through a guide wall 28 so as to enable the filister 29 at its inner end, to rest against the center of the disc or body of the bearer 22.

The casing 1 has an extension comprising two diametrically opposite posts 30 that are integral with an outer wall 31 of substantially circular form, and from the inner end of this wall a neck 32 extends, the inner end of which has a threaded nipple 33 to screw into a socket in the wall of the tank, which socket is usually in the form of a bushing set in an opening in the tank wall. In this way the Invar rod 27 and its tubular casing 34 which is of a material having a high coefficient of expansion such as copper, project into the water or other liquid within the tank. The outer end of the Invar rod 27 has a thread connection 35 with a plug 36 that is threaded into the outer end of the tubular casing 34. The thread 37 on the inner end of the Invar rod 27, does not extend to the bottom of the threaded opening in the plug 36, thereby leaving a clearance space 38 at its inner end to insure that the Invar rod can be readily adjusted at its thread 37 to position its filister 29 at the proper location to enable the snap disc 18 to snap over accurately at the temperature prevailing in the tank to which the device is attached.

In order to expose substantially the entire length of the tube 34 (which is usually of copper) to the water in the tank, the neck 32 is preferably provided with a bore 39 of considerably larger diameter than the tube, to permit the water in the tank to extend up substantially to the location of the wall 31 of the valve casing.

Between the posts 30 a clearance space 40 is formed, in which an adjusting arm 41 may be provided for orienting the Invar rod 27 on the location of its axis to adjust its filister 29 as desired. This arm 41 carries a set screw or small bolt 42 for rigidly securing it to the rod, and the end of the arm projects out from the clearance space 40 and has a laterally extending finger 43 that moves along a scale 44 formed on the adjacent end of the casing 1, which is of substantially cylindrical shape.

If desired, the wall 28 may be provided with a bore on its face to receive packing 45 which may, if desired, be held in the socket by means of a small coil spring 46, the outer end of which thrusts against the side of the hub of the arm 41.

As is illustrated on Fig. 1, the inner end of the body of the casing 1 may seat against a washer 47, which in turn seats against the outer face of an outer shell 48 if such a shell is provided on the tank for retaining insulation or lagging.

The valve-closure 11 in the present instance is biased toward its closed position by a coil spring 11a.

Referring to Figs. 4 to 9, inclusive, and particularly to Figs. 4 to 7, it should be stated that in making the disc 18, we prefer to employ a stainless steel known to the trade under the number 420. This steel is very adaptable to our purpose. A blank is first punched out from this stainless steel and formed with the openings 20. This blank is then pressed between two dies 49 and 50 to give the material of the disc a permanent set in a concavo-convex form such as indicated in Fig. 5. The radius of the co-operating spherical faces 51 and 52 of these dies is preferably approximately a two inch radius. And after the dies have been forced together in a press, the disc is removed, whereupon it will be found that the disc will then assume a concavo-convex form, the curvature of its faces being approximately to a four inch radius. The presence of the openings 20 greatly increases the facility of this disc in snapping between its two positions of equilibrium, and particularly when used in co-operation with other features of the disc which will presently be described. The presence of the perforations is advantageous because it increases the flexibility of the disc in snapping over between its two extreme positions and this is probably due to the absence of the metal at the place where the perforations are formed. In other words, the area of the perforations can reduce when the disc is snapping over from one extreme position to the other.

After removing the disc from the dies 49 and 50, it is placed between two dies such as the dies 53 and 54. The latter die has a spherical concave face 55 disposed substantially on a four inch radius, that is to say, approximately the same radius as the curved faces assumed by the disc after it leaves the dies shown in Fig. 4. The upper die 53 is formed with a plurality of downwardly projecting abutments or posts 56 preferably having substantially the cross-section illustrated in Fig. 7. The bottom faces 57 of these posts are curved to substantially the same radius as the concave face 55 of the lower die. With the die 53 in place, we subject it to a considerable blow with a trip-hammer or any equivalent means. This blow is sufficient to reduce the thickness of the metal in the disc at the areas that are in contact with the bottom faces of the posts 56. When the disc is placed between the dies 53 and 54, the openings 20 of the disc are preferably placed in substantial radial alignment with the posts 56.

As a result of the blow struck upon the upper side of the die 53, the thickness of the metal at the areas 58 that are located in line with the openings, will be considerably reduced. This reduction is indicated in Fig. 9. A portion of the metal at these areas, is forced laterally so as to produce small ridges 59 between which the thickness of the metal is substantially the same as that in the original disc.

In Figs. 10 and 11 we illustrate another application of this snap action disc in an organization that will operate as a safety shut-off valve. In this type of mechanism, if a pilot flame becomes extinguished, the valve closure that is normally open so as to maintain supply to the burner, will shut automatically. Referring to these figures, the pilot flame at 60 keeps the tube 61 heated, in an elongated state corresponding to its temperature. If the flame at 60 becomes extinguished, the tube 61 will shorten and shift the Invar rod 62 toward the left. This will shift the bearer 63 toward the left in its guide bore 64. In the present instance, the annular lip or bead 65 on the bearer, engages the edge of the disc 66 near its extreme edge, and near this bead but toward the center of the disc, an annular ridge 67 operates as the fulcrum to resist the pressure on the edge of the disc. This will cause the disc 66 to reverse itself and snap over to an opposite position such as that indicated in Fig. 11. This of course permits the coil spring 68 that biases the valve closure 69 toward its closed position, to move the valve closure against the valve seat 70 that holds the valve against the annular bead or rib 71. In this adaptation of the invention as well as that illustrated in Figs. 1 to 3, the flow of the gas past the valve closure occurs directly through the valve-seat 70, through circumferentially disposed ports 72 in the same, which have substantially the same area as the circumferential openings 73 in the disc 66, which is also substantially the same as the area of the openings or ports 74 in the bearer 63. The flow of gas is up through the inlet 75 and from the delivery chamber 76 in the valve casing 77 to and through the outlet 78.

The pilot tube 79 communicates with this chamber 76 as indicated. The valve closure 69 is centered and guided by the same means as illustrated in the valve shown in Fig. 1, and the valve chamber 80 is closed by a removable cap 81 similar to the cap or plug 3 described in connection with Fig. 1.

Many other embodiments of the invention may be resorted to without departing from the spirit of the invention.

We claim as our invention:

In a thermostatically-controlled valve mechanism for controlling flow of a fluid, the combination of a valve-casing having a valve-seat with a valve port, a valve-closure guided to move relative to said seat so as to control flow of the fluid through the port, a perforated snap-action disc mounted in said casing, a bearer with perforations therethrough having a part for engaging the disc adjacent its edge, means for guiding the bearer to enable it to exert a thrust force against said disc, and heat-sensitive means for exerting force on said bearer to cause said disc to snap over and move said valve-closure at a predetermined temperature to which the heat sensitive means is subjected, said valve-casing having an inlet and an outlet between which the fluid flows, so as to pass through the perforations in the disc and the bearer.

ERICH SCHUSTER.
RAYMOND D. GATES.

REFERENCES CITED

The following references are of record in the file of this patent:

UNITED STATES PATENTS

| Number | Name | Date |
|---|---|---|
| 1,744,465 | Grayson | Jan. 21, 1930 |
| 1,926,000 | Dougherty | Sept. 5, 1933 |
| 1,977,656 | Vaughn | Oct. 23, 1934 |
| 1,994,470 | Grayson | Mar. 19, 1935 |
| 2,137,617 | Imes et al. | Nov. 22, 1938 |
| 2,166,239 | Davis | July 18, 1939 |
| 2,216,510 | Burns | Oct. 1, 1940 |
| 2,236,908 | Jackson | Apr. 1, 1941 |
| 2,253,552 | Burch | Aug. 26, 1941 |
| 2,327,582 | Dougherty | Aug. 24, 1943 |
| 2,427,756 | West | Sept. 23, 1947 |